US012469012B2

United States Patent
Paul et al.

(10) Patent No.: US 12,469,012 B2
(45) Date of Patent: Nov. 11, 2025

(54) DETERMINING MAINTENANCE INTERVALS USING A COMBINATION OF MODELS

(71) Applicant: The Boeing Company, Arlington, VA (US)

(72) Inventors: Ranjan K. Paul, Sammamish, WA (US); Jan Irvahn, Richland, WA (US); Christopher D. Deits, Renton, WA (US); Liessman E. Sturlaugson, St. Louis, MO (US); Ameya Deepak Kamat, Bengaluru (IN)

(73) Assignee: The Boeing Company, Arlington, VA (US)

( * ) Notice: Subject to any disclaimer, the term of this patent is extended or adjusted under 35 U.S.C. 154(b) by 225 days.

(21) Appl. No.: 18/157,620

(22) Filed: Jan. 20, 2023

(65) Prior Publication Data
US 2024/0249248 A1 Jul. 25, 2024

(51) Int. Cl.
G06Q 30/00 (2023.01)
G06Q 10/20 (2023.01)

(52) U.S. Cl.
CPC .................. *G06Q 10/20* (2013.01)

(58) Field of Classification Search
None
See application file for complete search history.

(56) References Cited

U.S. PATENT DOCUMENTS 8,117,007 B2 2/2012 Yitbarek et al.
10,124,893 B1 * 11/2018 Aalund .................. G07C 5/006
(Continued)

OTHER PUBLICATIONS

Improved Estimation of Aircraft Probability of Failure, Macheret, Yevgeny; Teichman, Jeremy. IEEE Aerospace Conference Proceedings 2008 Institute of Electrical and Electronics Engineers, Inc , 445 Hoes Ln, Piscataway, NJ, 08854-1331, USA, [mailto: inspec@IEEE.org], [URL:http://ieee.org]. (2008). (Year: 2008).*

(Continued)

Primary Examiner — Matthew T Sittner
(74) Attorney, Agent, or Firm — Alleman Hall & Tuttle LLP

(57) ABSTRACT

An example method performed by a computing system for determining a maintenance interval for a subject aircraft configuration comprises obtaining sensor data reported by an electronic system of a population of the subject aircraft configuration. The method further comprises obtaining a failure mode definition that identifies a set of failure modes involving a component of the subject aircraft configuration. The method further comprises implementing a first predictive model to determine a first lifetime-probability distribution of a failure mode involving the component based on the sensor data. The method further comprises implementing a second predictive model that differs from the first predictive model to determine a second lifetime-probability distribution of a failure mode involving the component based on the sensor data. The method further comprises determining a maintenance interval for the component based on the first lifetime-probability distribution and the second lifetime-probability distribution.

20 Claims, 8 Drawing Sheets

(56) References Cited

U.S. PATENT DOCUMENTS

| | | | |
|---|---|---|---|
| 11,238,417 B2 | 2/2022 | Sturlaugson et al. | |
| 2015/0254601 A1* | 9/2015 | Rodrigues | G06Q 10/087 705/28 |
| 2019/0092495 A1* | 3/2019 | Lu | G07C 5/0816 |
| 2019/0108084 A1* | 4/2019 | Hipp | G05B 23/0278 |
| 2019/0304212 A1* | 10/2019 | Bailey | G07C 5/0825 |
| 2020/0210968 A1* | 7/2020 | Mojtahedzadeh | G06Q 10/00 |
| 2022/0360323 A1* | 11/2022 | Dooling | H04B 7/18519 |

OTHER PUBLICATIONS

Prognostics and health management techniques for integrated avionics systems, Chenghao Li; Le Ru. 2019 Prognostics and System Health Management Conference (PHM-Qingdao): 5 . IEEE. (2019). (Year: 2019).*

Effect of improving accuracy of load monitoring on aircraft probability of failure, Macheret, Yevgeny; Koehn, Phillip. IEEE Aerospace Conference Proceedings IEEE Computer Society. (Sep. 28, 2007). (Year: 2007).*

European Patent Office, Extended European Search Report Issued in Application No. 23220305.9, Jun. 13, 2024, Germany, 7 pages.

* cited by examiner

DETERMINING MAINTENANCE INTERVALS USING A COMBINATION OF MODELS

FIELD

An invention of the present disclosure relates generally to determining maintenance intervals for aircraft using predictive models implemented by a computing system.

BACKGROUND

Maintenance of aircraft involves performing maintenance tasks according to a maintenance interval to ensure proper functioning of the aircraft and its components. Performing such maintenance typically requires that the aircraft be taken out of service for a period of time. Accordingly, operators of aircraft fleets may seek to minimize or reduce the frequency of maintenance intervals.

SUMMARY

A computing system and methods performed by the computing system are disclosed for determining a maintenance interval for a subject aircraft configuration.

An example method performed by the computing system comprises obtaining sensor data reported by an electronic system of a population of the subject aircraft configuration. The method further comprises obtaining a failure mode definition that identifies a set of failure modes involving a component of the subject aircraft configuration. The method further comprises implementing a first predictive model at the computing system to determine a first lifetime-probability distribution of a failure mode of the set of failure modes involving the component based, at least in part, on the sensor data. The method further comprises implementing a second predictive model at the computing system that differs from the first predictive model to determine a second lifetime-probability distribution of a failure mode of the set of failure modes involving the component based, at least in part, on the sensor data. The method further comprises determining a maintenance interval for the component based, at least in part, on the first lifetime-probability distribution and the second lifetime-probability distribution. The method further comprises outputting the maintenance interval.

Another example method performed by the computing system comprises obtaining sensor data reported by an electronic system of a population of the subject aircraft configuration. The method further comprises obtaining a maintenance task definition that identifies an initial maintenance task for the subject aircraft configuration having a plurality of maintenance subtasks, a maintenance interval for the maintenance task, and one or more components of the subject aircraft configuration for each maintenance subtask. The method further comprises obtaining a failure mode definition that identifies a set of failure modes involving one or more components of the subject aircraft configuration for each of the plurality of maintenance subtasks. The method further comprises for the set of failure modes of a maintenance subtask, determining a maintenance interval for the maintenance subtask across the set of failure modes by: (1) for each failure mode of the set of failure modes, implementing one of a plurality of predictive models at the computing system to determine a life-time probability distribution of the failure mode based, at least in part, on the sensor data, (2) determining a maintenance interval for the one or more components of the maintenance subtask based, at least in part, on the life-time probability distribution determined for each failure mode of the set of failure modes. The method further comprises outputting the maintenance interval for the maintenance subtask.

DETAILED DESCRIPTION

Maintenance of aircraft involves performing maintenance tasks according to a maintenance schedule to ensure proper functioning of the aircraft and its components. The subject application discloses a computing system and methods performed by the computing system to determine a maintenance interval for a subject aircraft configuration. The disclosed computing system and methods can use a combination of predictive models to determine a maintenance interval. By using combinations of models to satisfy the intents of the different maintenance tasks, it may be possible to improve the accuracy of aircraft health maintenance. Specifically, risk of failure modes may be more accurately reflected by using a combination of models than in performing separate scheduled tasks to address the failure mode individually. For example, if a sensor that detects whether lubrication/servicing task is needed, a combination of a condition-based model from the operating conditions sensed by the sensor and a risk-based model may provide a more accurate assessment of the risk of a failure mode associated with not performing the lubrication/servicing task.

The multi-model approach to determining maintenance intervals disclosed herein can be used to divide existing maintenance tasks into a number of subtasks having different maintenance intervals. Additionally or alternatively, this multi-model approach can be used to lengthen maintenance intervals for existing maintenance tasks or subtasks by more accurately characterizing failure modes associated with delayed maintenance.

Figure 1:
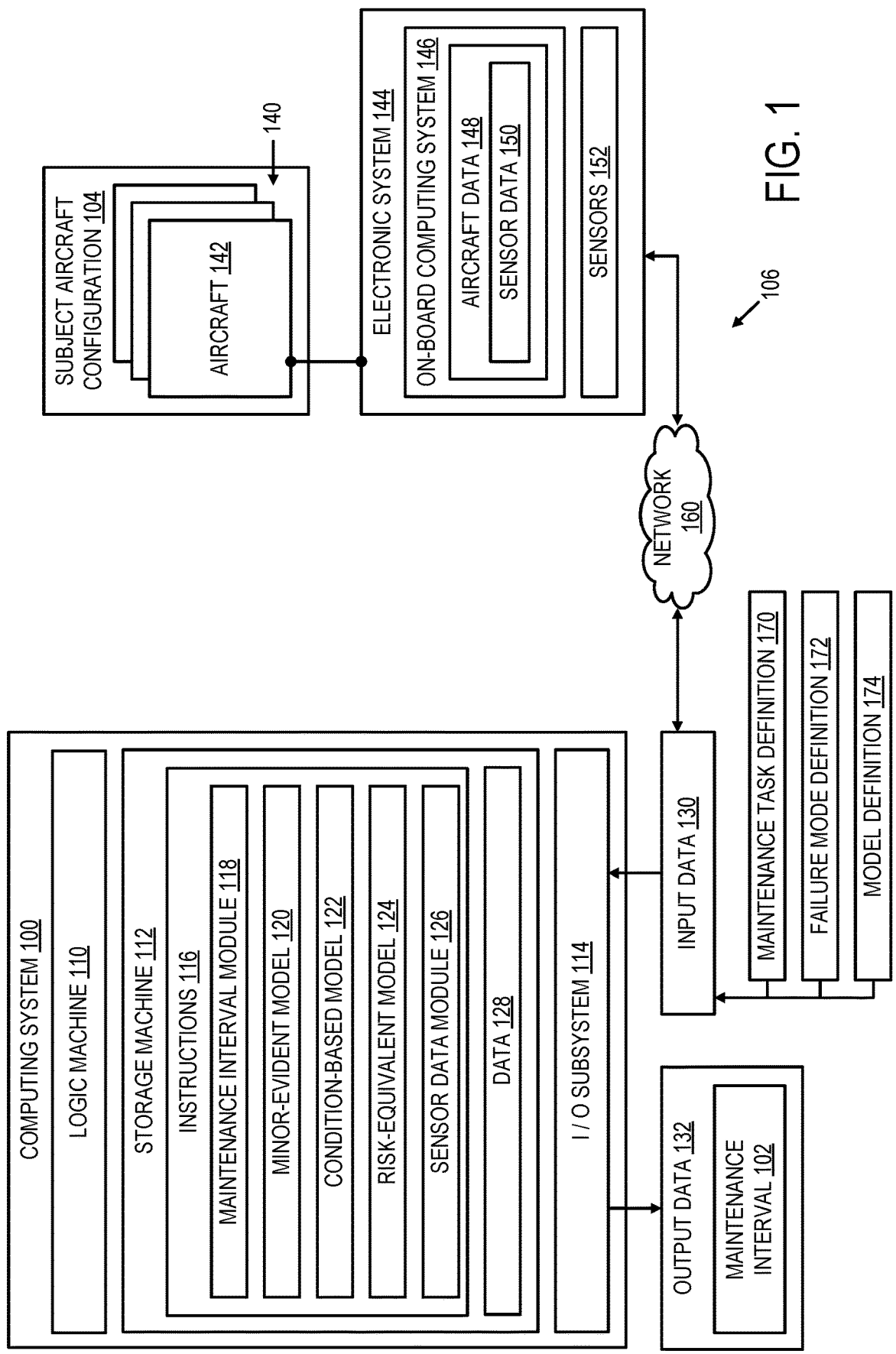
FIG. 1 schematically depicts an example computing system of one or more computing devices that can be used to determine a maintenance interval for a subject aircraft configuration.

FIG. 1 schematically depicts an example computing system 100 of one or more computing devices that can be used to determine a maintenance interval 102 for a subject aircraft configuration 104. Computing system 100 is depicted in FIG. 1 within the context of an operating environment 106 that includes additional components and features as described herein.

Computing system 100 includes a logic machine 110, a storage machine 112, and an input/output subsystem 114. Storage machine 112 includes instructions 116 stored thereon that are executable by logic machine 110 to perform the methods, operations, and other functions described herein. Example components of instructions 116 include a maintenance interval module 118, a minor-evident model 120, a condition-based model 122, a risk-equivalent model 124, and a sensor data module 126. These components of instructions 116 will be described in further detail herein in relation to the example methods, operations, and other functions that can be performed by computing system 100.

As a brief introduction, minor-evident model 120 considers a magnitude of a failure to determine a lifetime-probability distribution of a failure mode involving one or more components of the subject aircraft configuration. Minor-evident model 120 is described in further detail with reference to FIG. 5. Condition-based model 122 considers a whether a condition has been met on a per-aircraft basis based on sensor data obtained from the aircraft to determine a lifetime-probability distribution of a failure mode for one or more components of the aircraft. Condition-based model 122 is described in further detail with reference to FIG. 6. Risk-equivalent model 124 considers in-service risk by combining a measure of scheduled maintenance with risk and a measure of predictive maintenance with precision to determine a lifetime-probability distribution of a failure mode for one or more components of the aircraft. Risk-equivalent model 124 is described in further detail with reference to FIG. 7.

Storage machine 112 further includes data 128 stored thereon that can include input data 130 received by computing system 100, data processed by the computing system, and output data 132 generated by the computing system. Maintenance interval 102 is an example of output data 132.

Subject aircraft configuration 104 can identify and characterize a particular configuration of aircraft, such as by model, classification, type, and/or rating. As an example, subject aircraft configuration 104 can refer to a particular model of commercial, fixed-wing aircraft. Within operating environment 106, a population 140 of aircraft, including example aircraft 142, are each instances of subject aircraft configuration 104. It will be understood that a variety of other aircraft configurations can exist with respect to which other populations of aircraft can be identified and characterized.

Each aircraft of subject aircraft configuration 104 can include an electronic system located on-board the aircraft. As an example, aircraft 142 includes an electronic system 144 that includes an on-board computing system 146 and a set of sensors 152 that form components of the aircraft. On-board computing system 146 can acquire and store aircraft data 148, including sensor data 150 obtained from sensors 152.

Sensor data 150 can take various forms depending on the types of sensors 152 on-board aircraft 142. As examples, sensor data 150 can include error codes indicating a failure and/or a failure mode relating to one or more components, time-based sensor measurements that provide an indication of degradation, failure, and/or a failure mode of one or more components, measurements of operating conditions under which the aircraft and components thereof operated, and measurements of aircraft and component utilization (e.g., quantity of cycles, flight hours, time-base utilization, etc.).

Sensor data 150 is one example of input data 130 that can be provided to and received by computing system 100. In at least some examples, sensor data 150 can be provided to and received by computing system 100 via a communications network 160. Each aircraft of population 140 can similarly provide sensor data to computing system 100 as input data 130, and the input data can be stored by computing system 100 within data 128 of storage machine 112.

Other forms of input data 130 that can be provided to and received by computing system 100 for inclusion in data 128 can include a maintenance task definition 170, a failure mode definition 172, and a model definition 174. Maintenance task definition 170 identifies one or more maintenance tasks for subject aircraft configuration 104 in which each maintenance task can have a plurality of maintenance subtasks, and one or more components of the subject aircraft configuration for each maintenance subtask. Failure mode definition 172 identifies a set of failure modes involving a component of subject aircraft configuration 104 for each component of the subject aircraft configuration for which a maintenance interval (e.g., 102) is to be determined. Model definition 174 identifies, for each failure mode of a set of failure modes involving each component of subject aircraft configuration 104, one or more predictive models to be implemented by computing system 100 for that failure mode from among a set of predictive models (e.g., 120, 122, 124).

Sensor data module 126 can be implemented by computing system 100 to intake, store, and process sensor data (e.g., 150) from aircraft (e.g., 142) of subject aircraft configuration 104 into forms of data suitable for use by other components of instructions 116, including maintenance interval module 118.

Maintenance interval module 118 can be implemented by computing system 100 to determine maintenance interval 102 for subject aircraft configuration 104. Maintenance interval module 118 can use one or more predictive models, such as minor-evident model 120, condition-based model 122, and risk-equivalent model 124 in determining maintenance interval 102.

Figure 2:
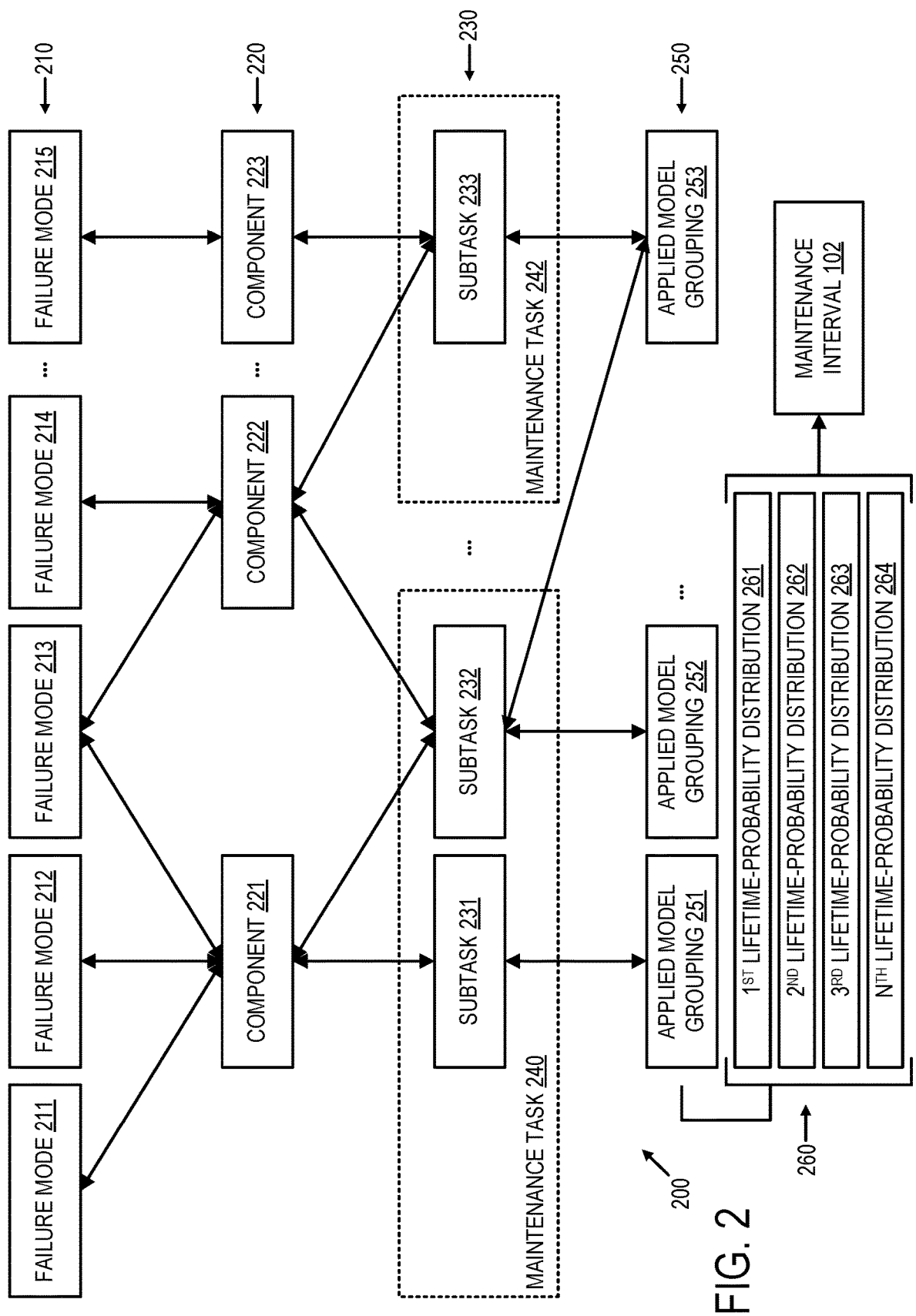
FIG. 2 schematically depicts an example relationship between failure modes, components, maintenance tasks, and predictive models.

FIG. 2 schematically depicts an example relationship 200 between failure modes, components, maintenance tasks, and predictive models that can be used to determine a maintenance interval for a subject aircraft configuration. Relationship 200 can be represented as data 128 stored by computing system 100 of FIG. 1 within storage machine 112, as an example. Data representing the failure modes, components, maintenance tasks, and predictive models implemented by a computing system, such as computing system 100 of FIG. 1 can be received by the computing system as input data 130.

A subject aircraft configuration can include thousands, millions, or more components that form a set of components, each of which can be associated with one or more failure modes that form a set of failure modes. Within example relationship 200 of FIG. 2, a set of failure modes 210 are associated with a set of components 220 of a subject aircraft configuration (e.g., 104 of FIG. 1). For example, failure modes 211, 212, and 213 are associated with component 221; failure modes 213 and 214 are associated with another component 222, and failure mode 215 is associated with yet another component 223 of the subject aircraft configuration.

Some components of the set of components 220 can each be associated with a plurality of different failure modes, such as component 221 that is associated with failure modes 211, 212, and 213; and component 222 that is associated with failure modes 213 and 214. Some components of the set of components 220 can be associated with a single failure mode, such as component 223 that is associated with failure mode 215. Furthermore, some failure modes of the set of failure modes 210 can be associated with a plurality of different components, such as failure mode 213 that is associated with components 221 and 222. Failure mode 213 is an example of a multi-component failure mode. Some failure modes of the set of failure modes 210 can be associated with a single component, such as failure mode 215 that is associated with component 223. As illustrated by these examples, a component of a subject aircraft configuration can be associated with only a subset of the set of failure modes of the subject aircraft configuration.

Each component of a set of components of a subject aircraft configuration can be associated with one or more maintenance subtasks. Within example relationship 200 of FIG. 2, the set of components 220 are associated with a set of maintenance subtasks 230. For example, component 221 is associated with maintenance subtasks 231 and 232; component 222 is associated with maintenance subtasks 232 and 233, and component 223 is associated with maintenance subtask 233.

Some maintenance subtasks of the set of maintenance subtasks 230 can each be associated with a plurality of components of the set of components 220, such as maintenance subtask 232 that is associated with components 221 and 222; and maintenance subtask 233 that is associated with components 222 and 223. Some maintenance subtasks of the set of maintenance subtasks 230 can each be associated with an individual component of the set of components 220, such as maintenance subtask 231 that is associated with component 221. As illustrated by these examples, a maintenance subtask for a subject aircraft configuration can be associated with only a subset of the set of components of the subject aircraft configuration, and hence can be associated with only a subset of the set of failure modes of the subject aircraft configuration.

By delineating maintenance subtasks by the failure modes that could impact a subset of components, it is possible to divide existing maintenance tasks into two or more maintenance subtasks that are assigned maintenance intervals that reduce or eliminate redundant maintenance. For example, within FIG. 2, the set of maintenance subtasks 230 can be initially organized into one or more maintenance tasks, such as maintenance task 240 containing maintenance subtasks 231 and 232, and maintenance task 242 containing maintenance subtask 233. Each maintenance subtask of the set of maintenance subtasks 230 can be defined to address each failure mode that is associated with a subset of components of the set of components 220. For example, maintenance subtask 232 of FIG. 2 is defined to address each failure mode of the set of failure modes that are associated with components 221 and 222.

Within example relationship 200 of FIG. 2, the set of maintenance subtasks 230 are associated with a set of applied model groupings 250. For example, maintenance subtask 231 is associated with applied model grouping 251, maintenance subtask 232 is associated with applied model grouping 252, and maintenance subtask 233 is associated with applied model grouping 253. Each applied model grouping of the set of applied model groupings 250 refers to an implementation of two or more predictive models. As one example, the two or more predictive models can include two or more instances of the same predictive model applied to different failure modes using different subsets of sensor data. Alternatively or additionally, the two or more predictive models can include two or more different predictive models applied to the same failure mode or to different failure modes.

As an example, maintenance interval module 118 of FIG. 1 can be executed by computing system 100 to implement two or more of minor-evident model 120, condition-based model 122, risk-equivalent model 124 to determine a respective maintenance interval across the subset of failure modes of each maintenance subtask of the set of maintenance subtasks 230. The particular combination of predictive models implemented as an applied model grouping can be defined based, at least in part, on model definition 174 of FIG. 1.

As described in further detail with reference to FIGS. 3 and 4, each applied model grouping implemented across one or more failure modes of a maintenance subtask can determine a set of lifetime-probability distributions 260. Each predictive model that is applied to one or more failure modes involving one or more components can determine a respective lifetime-probability distribution of the set of distributions 260. In at least some examples, each lifetime-probability distribution can take the form of a function that represents a probability in relation to a measure of aircraft utilization (e.g., flight cycles, flight hours, time, etc.) that the one or more failure modes occur. As an example, probability can be represented by a cumulative distribution function (CDF) that provides a measure of the percentage of lifelines of one or more components that have or have not experienced one or more failure events over a range of aircraft utilization (e.g., zero to X cycles). Other suitable forms of lifetime-probability distributions can be used.

Within the example of FIG. 2, the set of lifetime-probability distributions 260 can include a first lifetime-probability distribution 261, a second lifetime-probability distribution 262, a third lifetime-probability distribution 263, etc. through an Nth lifetime-probability distribution 264. As an example, applied model grouping 251 implemented for maintenance subtask 231 can determine a plurality of lifetime-probability distributions for failure modes 211, 212, and 213 involving component 221.

Example maintenance interval 102 can be determined by maintenance interval module 118 of FIG. 1 based on the set of lifetime-probability distributions 260 determined by the applied model grouping. As an example, a plurality of lifetime-probability distributions determined for a plurality of failure modes can be combined to obtain a combined lifetime-probability distribution that represents a probability that any of the plurality of failure modes occur relative to a measure of aircraft utilization. Maintenance interval module 118 of FIG. 1 can determine the maintenance interval for a particular threshold risk level (e.g., a threshold failure percentage) using the combined lifetime-probability distribution obtained by the applied model grouping. For example, maintenance interval module 118 can fit a threshold risk level to lifetime-probability distributions to determine maintenance intervals that are statistically predicted to satisfy the threshold risk level.

Figure 3:
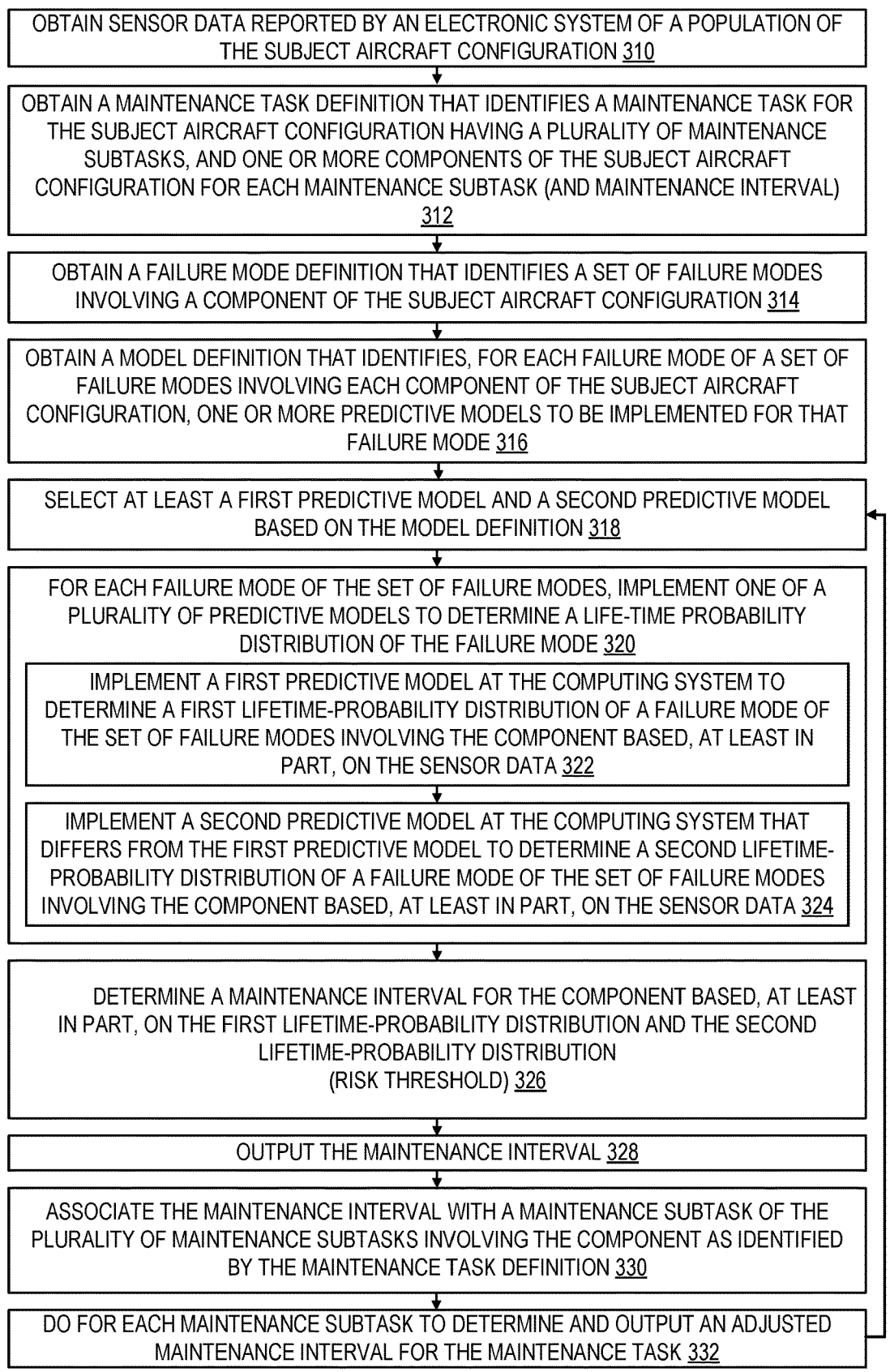
FIG. 3 is a flow diagram depicting an example method that can be performed by the computing system of FIG. 1 to determine a maintenance interval for a subject aircraft configuration.

FIG. 3 is a flow diagram depicting an example method 300 to determine a maintenance interval for a subject aircraft configuration. Method 300 can be performed by computing system 100 of FIG. 1 implementing maintenance interval module 118 to determine maintenance interval 102 for subject aircraft configuration 104, for example.

At 310, the method includes obtaining sensor data reported by an electronic system of a population of the subject aircraft configuration. As an example, computing system 100 of FIG. 1 can obtain sensor data 150 reported by electronic system 144 for each aircraft of population 140 of subject aircraft configuration 104. As previously described, population 140 can include one or more aircraft having the subject aircraft configuration, including tens, hundreds, thousands or more aircraft.

At 312, the method includes obtaining a maintenance task definition (e.g., 170 of FIG. 1). The maintenance task definition identifies one or more maintenance tasks for the subject aircraft configuration in which each maintenance task can have a plurality of maintenance subtasks, and one or more components of the subject aircraft configuration for each maintenance subtask. Additionally, in at least some examples, the maintenance task definition further identifies a maintenance interval for each maintenance task. This maintenance interval can refer to an existing maintenance interval of an existing maintenance task (e.g., 240 of FIG. 2) that is to be further refined by determining one or more maintenance intervals for one or more components addressed by the maintenance task and associated maintenance interval. Each maintenance interval determined by method 300 can be associated with a maintenance subtask of the maintenance task, enabling the maintenance task to be divided into any suitable quantity of maintenance subtasks having respective maintenance intervals.

At 314, the method includes obtaining a failure mode definition (172 of FIG. 1) that identifies a set of failure modes involving one or more components of the subject aircraft configuration. Referring to the example of FIG. 2, the set of failure modes can include failure modes 211, 212, and 213 associated with component 221, as an example.

At 316, the method includes obtaining a model definition (e.g., 174 of FIG. 1) that identifies, for each failure mode of the set of failure modes involving one or more of the components, one or more predictive models to be implemented by the computing system for that failure mode from among a set of predictive models.

At 318, the method includes selecting at least a first predictive model and a second predictive model based on the model definition. In some examples, the method at 318 can further include selecting additional predictive models based on the model definition. The predictive models selected at 318 refer to the predictive models to be implemented as part of determining the maintenance interval, and collectively form an example of an applied model grouping.

At 320, the method includes for each failure mode of a set of failure modes involving the one or more components, implementing at least one of a plurality of predictive models at the computing system to determine a life-time probability distribution of the failure mode based, at least in part, on the sensor data. Examples are provided below with respect to implementing two predictive models. However, as described in further detail herein, any suitable quantity of predictive models can be implemented depending on context.

At 322, the method includes implementing a first predictive model at the computing system to determine a first lifetime-probability distribution of a failure mode of the set of failure modes involving one or more components based, at least in part, on the sensor data. The first predictive model can include one of the following predictive models: minor-evident model 120, condition-based model 122, risk-equivalent model 124 of FIG. 1. The first predictive model implemented at 322 includes one of the predictive models selected at 318.

At 324, the method includes implementing a second predictive model at the computing system that differs from the first predictive model to determine a second lifetime-probability distribution of a failure mode of the set of failure modes involving the one or more components based, at least in part, on the sensor data. The second predictive model can include one of the following predictive models that differs from the first predictive model: minor-evident model 120, condition-based model 122, risk-equivalent model 124 of FIG. 1. The second predictive model implemented at 324 includes one of the predictive models selected at 318.

In at least some examples, the failure mode for which the first lifetime-probability distribution is determined by the first predictive model is a first failure mode of the set of failure modes involving the one or more components, and the failure mode for which the second lifetime-probability distribution is determined by the second predictive model is a second failure mode of the set of failure modes involving the one or more components that differs from the first failure mode. Thus, in this example, different predictive models can be applied to different failure modes involving the one or more components. Referring to the example of FIG. 2, applied model grouping 252 can refer to two different predictive models or to two instances of the same predictive model that are respectively applied to failure modes 213 and 214 associated with component 222 as part of determining a maintenance interval for subtask 232. In examples where two instances of the same predictive model are applied to two different failure modes, the two instances of the same predictive model can consider different subsets of the sensor data that are relevant to the respective failure modes.

In at least some examples, two or more different predictive models can be applied to the same failure mode. For example, within method 300, the failure mode for which the first lifetime-probability distribution is determined by the first predictive model can be a first failure mode, the failure mode for which the second lifetime-probability distribution is determined by the second predictive model can also be the first failure mode. Thus, in this example, different predictive models are applied to the same failure mode involving the one or more components, for example. Referring to the example of FIG. 2, applied model grouping 253 can refer to two different predictive models that are each applied to failure mode 215 associated with component 223 as part of determining a maintenance interval for subtask 233.

At 326, the method includes determining a maintenance interval for the component based, at least in part, on the first lifetime-probability distribution and the second lifetime-probability distribution. In at least some examples, the maintenance interval for the component can be further based, at least in part, on a combination of the first lifetime-probability distribution and the second lifetime-probability distribution determined by maintenance interval module 118. As an example, two or more lifetime-probability distributions for a failure mode can be combined as the product of the two or more lifetime-probability distributions.

In at least some examples, the maintenance interval for the component can be further based, at least in part, on a threshold risk level applied to the first lifetime-probability distribution and to the second lifetime-probability distribution. As an example, the threshold risk level can be applied to a combination of the first and second lifetime-probability distributions.

At 328, the method includes outputting the maintenance interval. As an example, the maintenance interval can be output via an output device (e.g., a graphical display). In at least some examples, the method at 330 further includes associating the maintenance interval that is output with a maintenance subtask of the plurality of maintenance subtasks involving the component as identified by the maintenance task definition.

The above description of method 300 involves an example in which a component is associated with one or more failure modes for which at least two predictive models are implemented to determine at least two probability distributions. Where the component is associated with additional failure modes, predictive models can be applied to those additional failure modes to address each failure mode involving the component. For example, where the component is associated with three failure modes, method 300 can further include implementing a predictive model at the computing system to determine a third lifetime-probability distribution of a third failure mode of the set of failure modes involving the component based, at least in part, on the sensor data. In this example, the third failure mode differs from the first failure mode and the second failure mode. In this example, determining the maintenance interval at 326 for the component is further based, at least in part, on the third lifetime-probability distribution of the third failure mode.

The predictive model implemented for the third failure mode can include one of: minor-evident model 120, condition-based model 122, risk-equivalent model 124 of FIG. 1. The predictive model implemented for the third failure mode can be the same as or can differ from the first predictive model implemented at 322 and the second predictive model implemented at 324. As an example, the first predictive model can be implemented at the computing system to determine the third lifetime-probability distribution of the third failure mode involving the component. As another example, a third predictive model that differs from the first and second predictive models can be implemented at the computing system to determine the third lifetime-probability distribution of the third failure mode involving the component.

The above approach to addressing additional failure modes involving a component can be applied to any suitable quantity of failure modes, and can involve the use of any combination of two or more predictive models, including minor-evident model 120, condition-based model 122, and/or risk-equivalent model 124 of FIG. 1. To determine the maintenance interval for a component involving N failure modes (where N represents a quantity of failure modes), a respective lifetime-probability distribution can be determined for each failure mode involving the component to obtain N lifetime-probability distributions, and the maintenance interval for the component can be determined based, at least in part, on the N lifetime-probability distributions.

In at least some examples, the set of failure modes involving the component of the subject aircraft configuration in method 300 includes a multi-component failure mode involving the component and one or more other components of the subject aircraft configuration. In these examples, the maintenance interval that is output is for a maintenance subtask for the component and the one or more other components of a multi-component failure mode. The maintenance interval in these examples can be determined at 326 based, at least in part, on the lifetime-probability distributions determined by each implemented predictive model across the failure modes for the multiple components, including the multi-component failure mode.

In at least some examples, aspects of method 300 can be performed for each maintenance subtask of a maintenance task. For example, the method at 332 can include determining a maintenance interval for each maintenance subtask of the maintenance task across the set of failure modes of that maintenance subtask, and outputting an adjusted maintenance interval for the maintenance task that differs from the initial maintenance interval. The adjusted maintenance interval can be based on a maintenance interval of a maintenance subtask having the shortest duration, as an example. Selecting the maintenance interval having the shortest duration can be used to ensure that the maintenance intervals of other maintenance subtasks having longer durations are satisfied.

Figure 4:
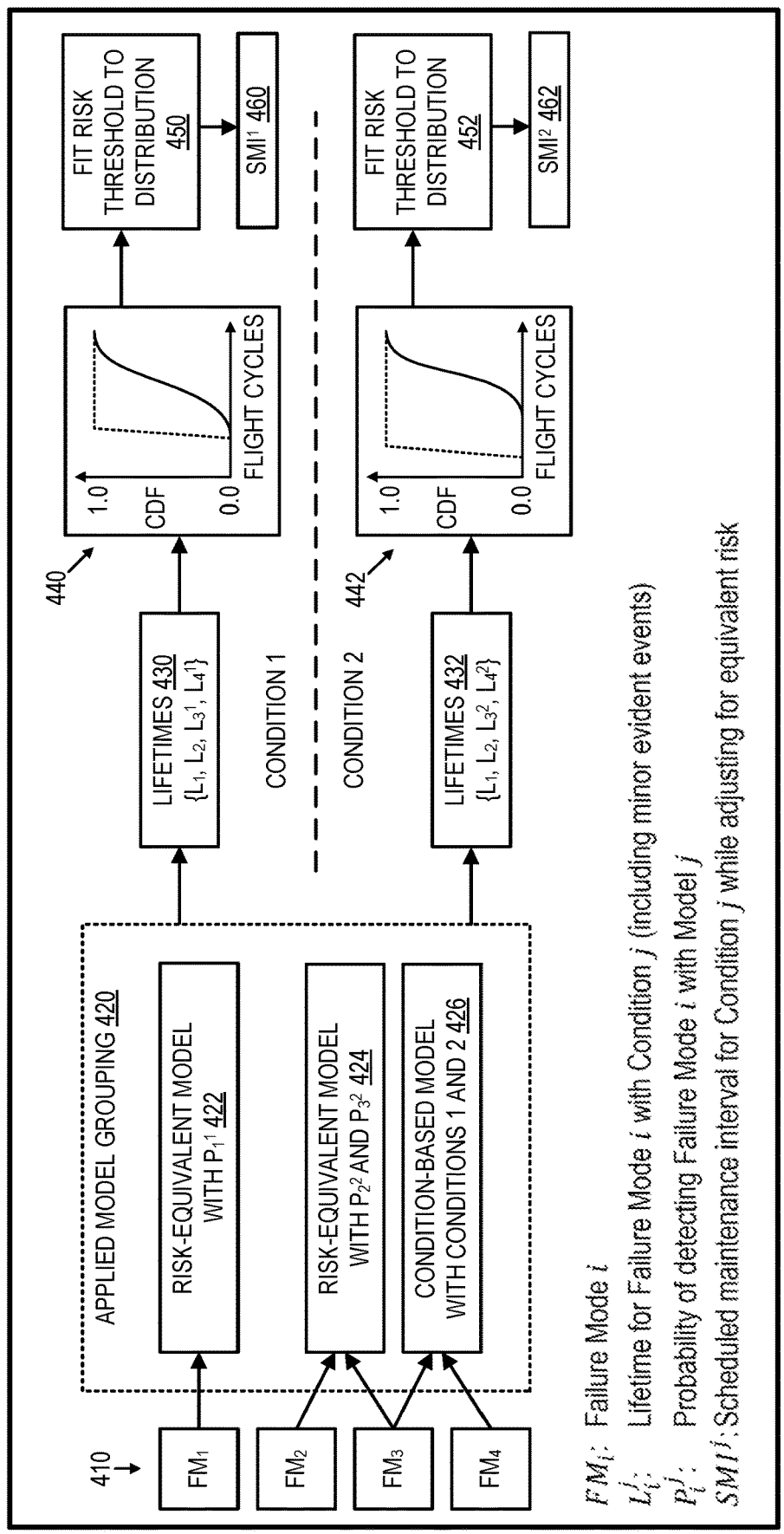
FIG. 4 is a flow diagram depicting an example use-scenario of the method of FIG. 3.

FIG. 4 is a flow diagram depicting an example use-scenario of the method of FIG. 3. In this example, a set of failure modes 410 are represented as $FM_1$, $FM_2$, $FM_3$, $FM_4$. An applied model grouping 420 is applied to the set of failure modes 410. In this example, applied model grouping 420 includes an instance 422 of risk-equivalent model 124 that is applied to $FM_1$, another instance 424 of risk-equivalent model 124 that is applied to $FM_2$ and $FM_3$, and an instance 426 of condition-based model 122 that is applied to $FM_3$ and $FM_4$ for conditions 1 and 2.

As described in further detail with reference to FIG. 6, condition-based model 122 can be used to determine a lifetime-probability distribution for each condition of a plurality of conditions (e.g., conditions 1 and 2) to enable a separate maintenance interval to be determined for each condition. Sensor data obtained from a particular aircraft can be used to determine whether the condition has been met with respect to that aircraft, and the maintenance interval for that condition can be determined for that aircraft.

In the example of FIG. 4, lifetime-probability distributions are separately determined for conditions 1 and 2. For example, component failure lifelines 430 (e.g., {L1, L2, L3, L4}) for condition 1 are used to generate a first lifetime-probability distribution 440 (e.g., a first CDF function for condition 1), and component failure lifelines 432 (e.g., {L1, L2, L3, L4}) for condition 2 are used to generate a second lifetime-probability distribution 442 (e.g., a second CDF function for condition 2).

At 450, a risk threshold is fit to first lifetime-probability distribution 440 to determine a first maintenance interval 460 (e.g., $SMI^1$) for condition 1. At 452, a risk threshold is fit to second lifetime-probability distribution 442 to determine a second maintenance interval 462 (e.g., $SMI^2$) for condition 2. Within the context of the equivalent-risk model, for the subset of failure modes $FM_1$, $FM_2$, $FM_3$ to which instances 422 and 424 of risk-equivalent model 124 are applied, equivalent risk can be calculated based on $P_1^1$, $P_2^2$, and $P_3^3$, which represent the probability of detecting the failure mode (subscript "i") with the model (superscript "j").

Figure 5:
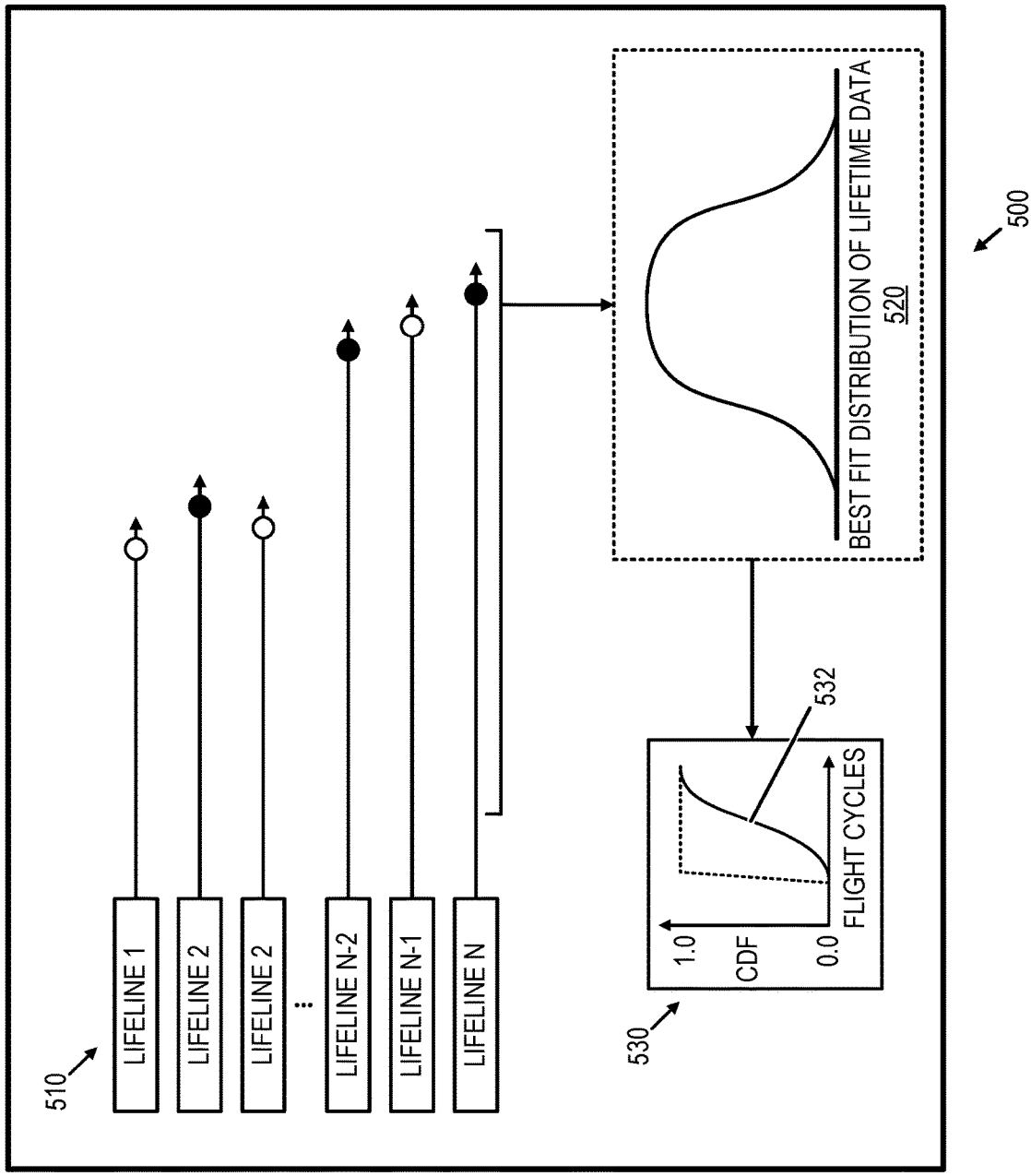
FIG. 5 is a flow diagram depicting an example method that can be performed by the computing system of FIG. 1 implementing a minor-evident model.

FIG. 5 is a flow diagram depicting an example method 500 that can be performed by computing system 100 of FIG. 1 implementing minor-evident model 120. Minor-evident model 120 considers a magnitude of a failure to determine a lifetime-probability distribution of a failure mode involving one or more components of the subject aircraft configuration. As an example, the magnitude of a failure can be characterized as being either minor or major. A minor failure can refer to failure of a component in a manner that does not cause loss of function, whereas a major failure can refer to a failure of a component in a manner that causes loss of function. Minor-evident model 120 effectively enables minor failures to be disregarded, and for major failures to influence the lifetime-probability distribution determined by the model. This approach can serve to increase maintenance intervals in at least some scenarios.

Within FIG. 5, a set of lifelines 510 for a component obtained from sensor data reported by aircraft is schematically depicted. Major failure events within the set of lifelines 510 are represented by a shaded circle, and minor failure events within the set of lifelines 510 are represented by an unshaded circle. A best fit distribution 520 of lifetime data from lifelines 510 is generated for major failure events. A lifetime-probability distribution 530 (e.g., CDF) function) is determined for the major failure events (represented by function 532) that can be used to determine a maintenance interval.

Figure 6:
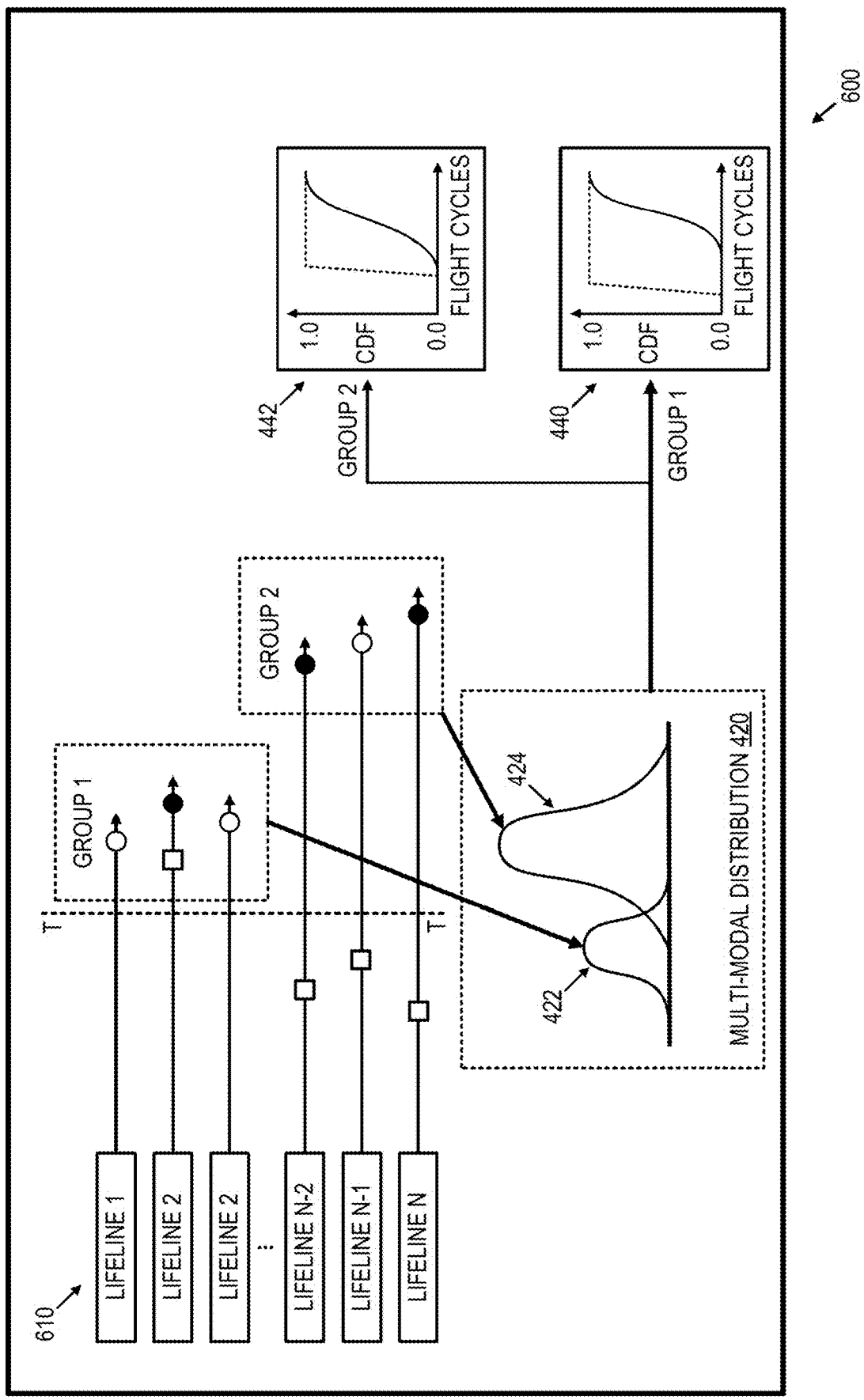
FIG. 6 is a flow diagram depicting an example method that can be performed by the computing system of FIG. 1 implementing a condition-based model.

FIG. 6 is a flow diagram depicting an example method 600 that can be performed by computing system 100 of FIG. 1 implementing condition-based model 122. Within condition-based model 122, a condition detected within sensor data obtained from sensors on-board a population of aircraft of a subject aircraft configuration can be used to detect whether a condition is met or not met. As an example, an inertial sensor on-board the aircraft can detect instances of hard landings (i.e., landings that exceed a threshold inertial measurement or other suitable definition). The condition can be correlated with lifetimes of a component of the aircraft. Continuing with hard landings, as an example, the component can include a landing gear component of the aircraft that experiences lifetimes that vary based on the condition of the quantity of hard landings.

Correlated conditions can be identified within the sensor data that accentuate multi-modality between a failure mode of the component and whether the condition is met. For example, a first time-based distribution of failures of the component for a first group (Group 1) of aircraft for which a condition has not been met can be distinguished from a second-time based distribution of failures of the component for a second group (Group 2) of aircraft for which the condition has been met.

Within FIG. 6, a set of lifelines 610 for a component obtained from sensor data reported by aircraft is schematically depicted. Failures are represented by a shaded circle within lifelines 610 and instances where failures are not present are represented by an unshaded circle. The presence of a condition is represented by a square within lifelines 610. Data represented by the set of lifelines 610 can be divided into Group 1 if the condition was not met prior to an interval decision point represented by time (T), and into Group 2 if the condition was met prior to time (T). Within FIG. 6, an example of multi-modality is depicted as multi-modal distribution 420 in which a first distribution 422 for Group 1 is distinguishable from a second distribution 424 for Group 2.

For a given aircraft, the sensor data obtained from that aircraft can be used to determine whether the condition has been met, and a lifetime-probability distribution corresponding to whether that condition has been met can be selected for that aircraft. For example, for an aircraft in which the condition has not been met by time (T) based on sensor data, first lifetime-probability distribution 440 (e.g., a first CDF) obtained from the data of Group 1 can be determined by the model, and where the condition has been met by time (T), second lifetime-probability distribution 442 (e.g., a second CDF) obtained from the data of Group 2 can be determined by the model. In at least some examples, the lifetime-probability distributions determined by the models disclosed herein from sensor data, including data grouped based on condition correlations by condition-based model 122 can use the statistical processing techniques disclosed by U.S. Pat. No. 8,117,007.

For a given lifetime-probability distribution determined by the model, a maintenance interval can be determined for a given threshold risk level. Continuing with hard landings, as an example, if a particular aircraft experienced fewer hard landings within a given time interval (e.g., time (T)) then the resulting maintenance interval for a component of the landing gear can be defined to be longer than if the aircraft experienced a greater quantity of hard landings.

Figure 7:
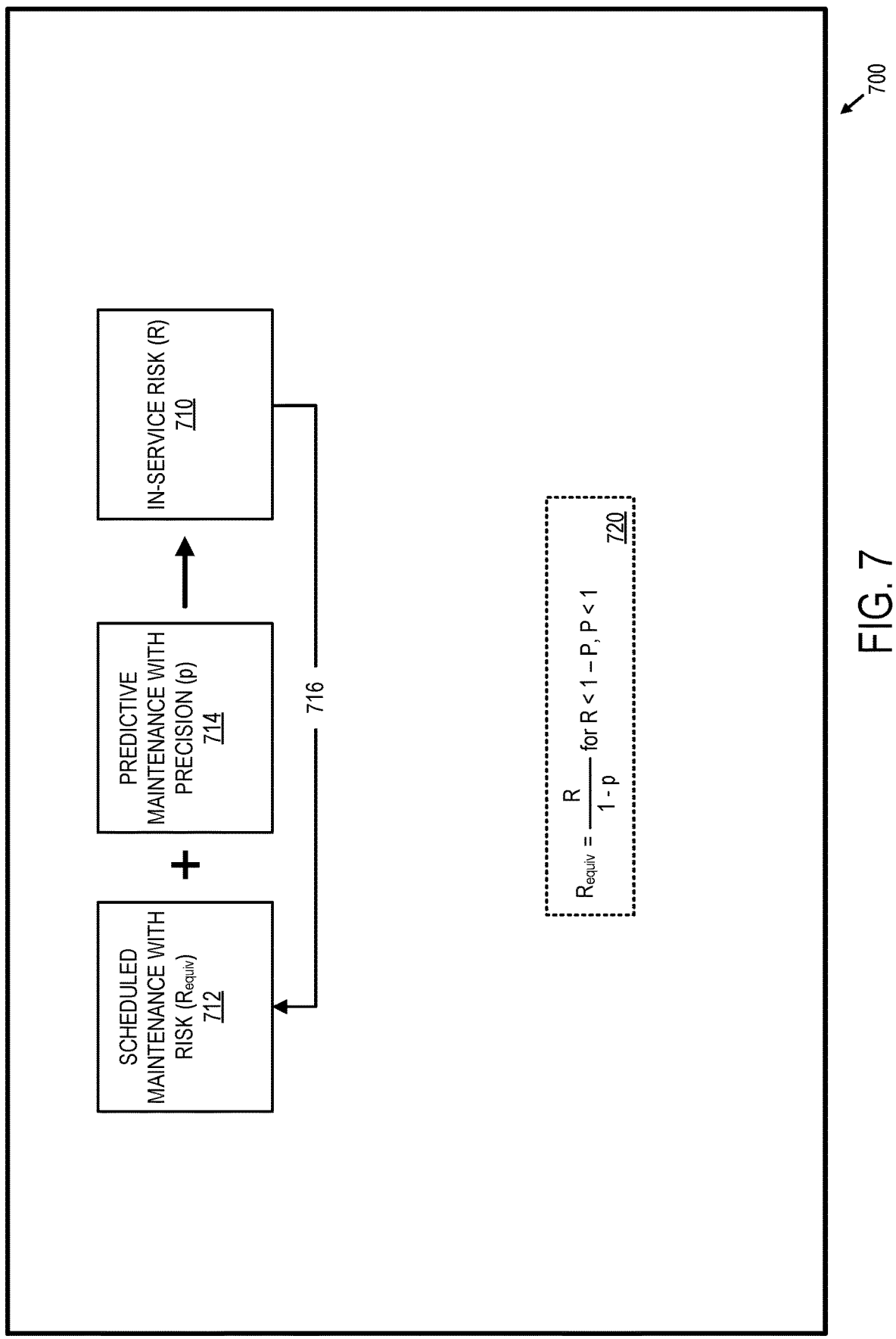
FIG. 7 is a flow diagram depicting an example method that can be performed by the computing system of FIG. 1 implementing a risk-equivalent model.

FIG. 7 is a flow diagram depicting an example method 700 that can be performed by computing system 100 of FIG. 1 implementing risk-equivalent model 124. Risk-equivalent model 124 considers in-service risk (R) 710 by combining (e.g., summing) a measure of scheduled maintenance with risk ($R_{equiv}$) 712 with a measure of predictive maintenance with precision (p) 714. As an example, in-service risk (R) 710 refers to a risk of failure of a set of one or more components (e.g., a relevant system) of an in-service aircraft; the measure of scheduled maintenance with risk ($R_{equiv}$) 712 refers to a targeted risk for scheduled maintenance optimization of the maintenance task or subtask associated with the set of one or more components; and the measure of predictive maintenance with precision (p) 714 refers to the probability of a failure prediction actually failing.

As shown by arrow 716, the in-service risk (R) can be used as feedback to iteratively seed the measure of scheduled maintenance with risk ($R_{equiv}$). The relationship between the measure of scheduled maintenance with risk ($R_{equiv}$) 712, the measure of predictive maintenance with precision (p) 714, and in-service risk (R) 710 can be represented by expression 720 within a range of precision (P). By using a range of values for precision (P), in-service risk (R) 710 output by the model can take the form of a lifetime-probability distribution.

In at least some examples, the precision (P) of the predictive model for a given set of (k) components can be determined by using a weighted sum of actual failure prediction probabilities of the individual components of the component set where the weights are the probabilities of the relevant system failure due to failure of the individual components. The precision (P) can consider redundancy provided by multiple instances of the components, such as the quantity (i) of component instances needed to fail for the relevant system to experience a failure.

Figure 8:
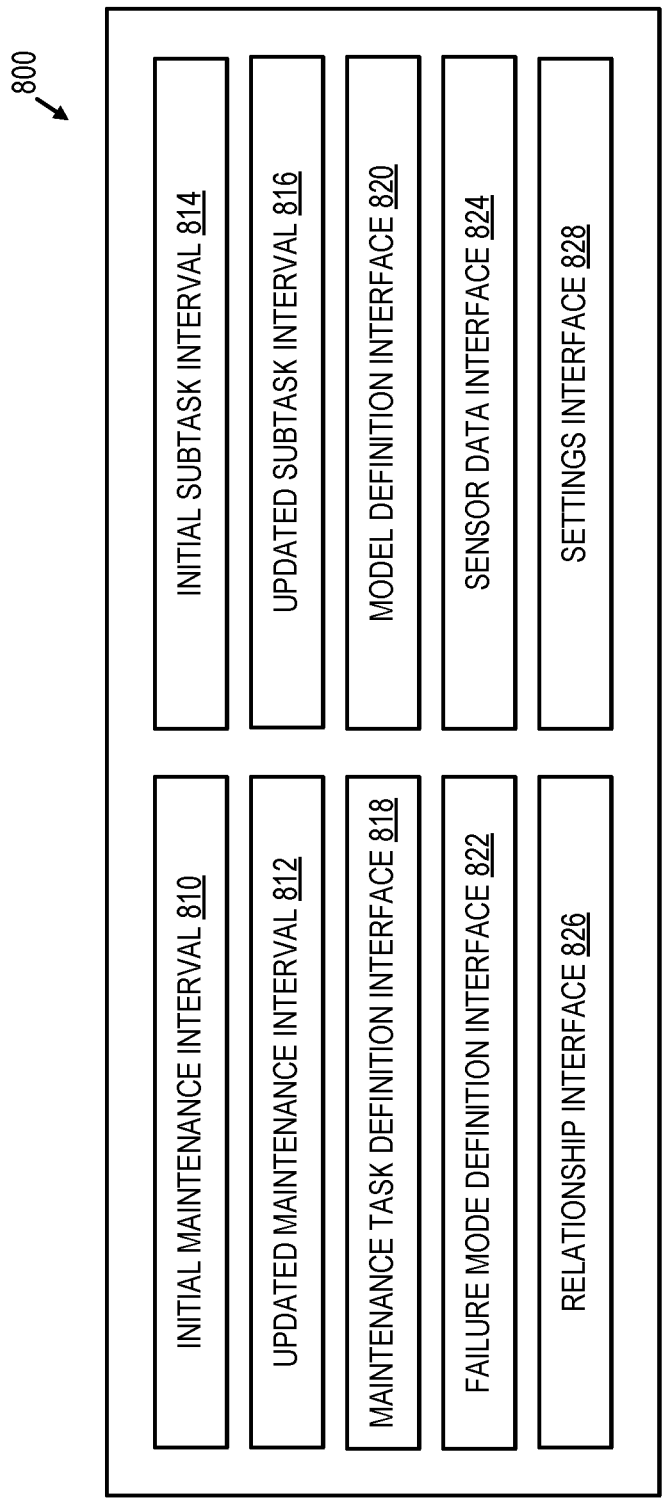
FIG. 8 depicts an example interface of the computing system of FIG. 1.

FIG. 8 depicts an example interface 800 of computing system 100 of FIG. 1 that enables users to interact with maintenance interval module 118. As an example, interface 800 may form part of or be provided by maintenance interval module 118 executed by computing system 100. Input data 130 of FIG. 1 can be provided by users via interface 800 and output data 132 of FIG. 1 can be provided to users via interface 800. Interface 800 can take the form of a graphical user interface in at least some examples.

Interface 800 can present an initial maintenance interval 810 for a maintenance task (e.g., maintenance task 240 of FIG. 2), an updated maintenance interval 812 for the maintenance task (e.g., as determined by method 300 of FIG. 3), an initial subtask interval 814 of a maintenance subtask (e.g., subtask 231 of FIG. 2), and an updated subtask interval 816 for the maintenance subtask (e.g., a maintenance interval determined by method 300 of FIG. 3 for the maintenance subtask).

Interface 800 includes a maintenance task definition interface 818 by which data of a maintenance task definition (e.g., 170 of FIG. 1) can be provided to the computing system as input data, provided by the computing system as output data, or modified by users.

Interface 800 includes a model definition interface 820 by which data of a model definition (e.g., 174 of FIG. 1) can be provided to the computing system as input data, provided by the computing system as output data, or modified by users.

Interface 800 includes a failure mode definition interface 822 by which data of a failure mode definition (e.g., 172 of FIG. 1) can be provided to the computing system as input data, provided by the computing system as output data, or modified by users.

Interface 800 includes a sensor data interface 824 by which sensor data (e.g., 150 of FIG. 1) can be provided to the computing system as input data, provided by the computing system as output data, or modified by users.

Interface 800 includes a relationship interface 826 by which data of a relationship (e.g., 200 of FIG. 2) between failure modes, components, maintenance tasks, and predictive models can be provided to the computing system as input data, provided by the computing system as output data, or modified by users.

Interface 800 includes a settings interface 828 by which settings (e.g., can be provided to the computing system as input data, provided by the computing system as output data, or modified by users. Examples of settings include a threshold risk level applied to lifetime-probability distributions, as described with reference to method 300 of FIG. 3.

As previously described with reference to FIG. 1, the methods and operations described herein can be tied to a computing system of one or more computing devices. In particular, such methods and operations can be implemented as a computer-application program or service, an application-programming interface (API), a library, and/or other computer-program product.

Computing system 100 of FIG. 1 is an example of a computing system that can enact one or more of the methods and operations described herein. It will be understood that computing system 100 is depicted schematically in simplified form. Computing system 100 can take the form of one or more personal computers, server computers, tablet computers, network computing devices, mobile computing devices, and/or other computing devices.

Logic machine 110 includes one or more physical devices configured to execute instructions (e.g., 116). For example, the logic machine can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result.

The logic machine can include one or more processors configured to execute software instructions. Additionally or alternatively, the logic machine can include one or more hardware or firmware logic machines configured to execute hardware or firmware instructions. Processors of the logic machine can be single-core or multi-core, and the instructions executed thereon may be configured for sequential, parallel, and/or distributed processing. Individual components of the logic machine optionally can be distributed among two or more separate devices, which can be remotely located and/or configured for coordinated processing. Aspects of the logic machine can be virtualized and executed by remotely accessible, networked computing devices configured in a cloud-computing configuration.

Storage machine 112 includes one or more physical devices configured to hold instructions (e.g., 116) executable by the logic machine to implement the methods and operations described herein. When such methods and operations are implemented, the state of the storage machine may be transformed (e.g., to hold different data).

Storage machine 112 can include removable and/or built-in devices. The storage machine can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The storage machine can include volatile, nonvolatile, dynamic, static, read/write, read-only, random-access, sequential-access, location-addressable, file-addressable, and/or content-addressable devices.

It will be understood that storage machine 112 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 110 and storage machine 112 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 100 implemented to perform a particular function. In some cases, a module, program, or engine can be instantiated via logic machine 110 executing instructions 116 held by storage machine 112. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

Input/output subsystem 114 can include or interface with a display subsystem. A display subsystem can be used to present a visual representation of data held by storage machine 112. This visual representation may take the form of a graphical user interface (GUI). As the herein described methods and operations change the data held by the storage machine, and thus transform the state of the storage machine, the state of the display subsystem may likewise be transformed to visually represent changes in the underlying data. The display subsystem can include one or more display devices. Such display devices may be combined with logic machine 110 and/or storage machine 112 in a shared enclosure, or such display devices may be peripheral display devices. Input/output subsystem can include or interface with one or more user-input devices such as a keyboard, mouse, touch screen, etc.

Input/output subsystem can include a communication subsystem configured to communicatively couple computing system 100 with one or more other computing devices. The communication subsystem can include wired and/or wireless communication devices compatible with one or more different communication protocols. As examples, the communication subsystem can be configured for communication via a wireless telephone network, or a wired or wireless local- or wide-area network. The communication subsystem can allow computing system 100 to send and/or receive messages to and/or from other devices via a network (e.g., 160) such as the Internet.

The present disclosure comprises configurations according to the following clauses.

Clause 1. A method performed by a computing system for determining a maintenance interval for a subject aircraft configuration, the method comprising: obtaining sensor data reported by an electronic system of a population of the subject aircraft configuration; obtaining a failure mode definition that identifies a set of failure modes involving a component of the subject aircraft configuration; implementing a first predictive model at the computing system to determine a first lifetime-probability distribution of a failure mode of the set of failure modes involving the component based, at least in part, on the sensor data; implementing a second predictive model at the computing system that differs from the first predictive model to determine a second lifetime-probability distribution of a failure mode of the set of failure modes involving the component based, at least in part, on the sensor data; determining a maintenance interval for the component based, at least in part, on the first lifetime-probability distribution and the second lifetime-probability distribution; and outputting the maintenance interval.

Clause 2. The method of Clause 1, wherein the failure mode for which the first lifetime-probability distribution is determined by the first predictive model is a first failure mode; and wherein the failure mode for which the second lifetime-probability distribution is determined by the second predictive model is a second failure mode that differs from the first failure mode.

Clause 3. The method of Clause 2, further comprising: implementing the first predictive model at the computing system to determine a third lifetime-probability distribution of a third failure mode of the set of failure modes involving the component based, at least in part, on the sensor data; wherein the third failure mode differs from the first failure mode; wherein determining the maintenance interval for the component is further based, at least in part, on the third lifetime-probability distribution.

Clause 4. The method of Clause 2, further comprising: implementing a third predictive model at the computing system to determine a third lifetime-probability distribution of a failure mode of the set of failure modes involving the component based, at least in part, on the sensor data; wherein the third predictive model differs from the first predictive model and the second predictive model.

Clause 5. The method of Clause 1, wherein the failure mode for which the first lifetime-probability distribution is determined by the first predictive model is a first failure mode; and wherein the failure mode for which the second lifetime-probability distribution is determined by the second predictive model is the first failure mode.

Clause 6. The method of any of Clauses 1-5, wherein the first predictive model and the second predictive model are each selected from a set of predictive models that includes two or more of: a minor-evident model that considers a magnitude of a failure of the component, a condition-based model that considers whether a condition has been met on a per-aircraft basis based on sensor data obtained from the aircraft, a risk-equivalent model that considers in-service risk.

Clause 7. The method of any of Clauses 1-6, further comprising: obtaining a model definition that identifies, for each failure mode of the set of failure modes involving the component, one or more predictive models to be implemented by the computing system for that failure mode from among a set of predictive models; and selecting the first predictive model and the second predictive model based on the model definition.

Clause 8. The method of any of Clauses 1-7, wherein the set of failure modes involving the component of the subject aircraft configuration includes a multi-component failure mode involving the component and one or more other components of the subject aircraft configuration; and wherein the maintenance interval that is output is for a maintenance subtask for the component and the one or more other components of a multi-component failure mode.

Clause 9. The method of any of Clauses 1-8, further comprising:
obtaining a maintenance task definition that identifies a maintenance task for the subject aircraft configuration having a plurality of maintenance subtasks, and one or more components of the subject aircraft configuration for each maintenance subtask; and associating the maintenance interval that is output with a maintenance subtask of the plurality of maintenance subtasks involving the component as identified by the maintenance task definition.

Clause 10. The method of any of Clauses 1-9, wherein the maintenance interval for the component is based, at least in part, on a combination of the first lifetime-probability distribution and the second lifetime-probability distribution.

Clause 11. The method of Clause 10, wherein the maintenance interval for the component is further based, at least in part, on a threshold risk level applied to the combination of the first lifetime-probability distribution and to the second lifetime-probability distribution.

Clause 12. A method performed by a computing system for determining a maintenance interval for a subject aircraft configuration, the method comprising: obtaining sensor data reported by an electronic system of a population of the subject aircraft configuration; obtaining a maintenance task definition that identifies an initial maintenance task for the subject aircraft configuration having a plurality of maintenance subtasks, a maintenance interval for the maintenance task, and one or more components of the subject aircraft configuration for each maintenance subtask; obtaining a failure mode definition that identifies a set of failure modes involving one or more components of the subject aircraft configuration for each of the plurality of maintenance subtasks; for the set of failure modes of a maintenance subtask, determining a maintenance interval for the maintenance subtask across the set of failure modes by: for each failure mode of the set of failure modes, implementing one of a plurality of predictive models at the computing system to determine a lifetime probability distribution of the failure mode based, at least in part, on the sensor data, and determining a maintenance interval for the one or more components of the maintenance subtask based, at least in part, on the life-time probability distribution determined for each failure mode of the set of failure modes; and outputting the maintenance interval for the maintenance subtask.

Clause 13. The method of Clause 12, further comprising: determining a maintenance interval for each maintenance subtask of the maintenance task across the set of failure modes of that maintenance subtask; and outputting an adjusted maintenance interval for the maintenance task that differs from the initial maintenance interval; wherein the adjusted maintenance interval is based on a maintenance interval of a maintenance subtask having the shortest duration.

Clause 14. The method of any of Clauses 12-13, wherein the plurality of predictive models includes two or more of: a minor-evident model that considers a magnitude of a failure of the component, a condition-based model that considers whether a condition has been met on a per-aircraft basis based on sensor data obtained from the aircraft, a risk-equivalent model that considers in-service risk.

Clause 15. A computing system of one or more computing devices, comprising: a logic machine; and a storage machine having instructions stored thereon executable by the logic machine to: obtain sensor data reported by an electronic system of a population of the subject aircraft configuration; obtain a failure mode definition that identifies a set of failure modes involving a component of the subject aircraft configuration; implement a first predictive model at the computing system to determine a first lifetime-probability distribution of a failure mode of the set of failure modes involving the component based, at least in part, on the sensor data; implement a second predictive model at the computing system that differs from the first predictive model to determine a second lifetime-probability distribution of a failure mode of the set of failure modes involving the component based, at least in part, on the sensor data; determine a maintenance interval for the component based, at least in part, on the first lifetime-probability distribution and the second lifetime-probability distribution; and output the maintenance interval.

Clause 16. The computing system of Clause 15, wherein the failure mode for which the first lifetime-probability distribution is determined by the first predictive model is a first failure mode; and wherein the failure mode for which the second lifetime-probability distribution is determined by the second predictive model is a second failure mode that differs from the first failure mode.

Clause 17. The computing system of Clause 15, wherein the failure mode for which the first lifetime-probability distribution is determined by the first predictive model is a first failure mode; and wherein the failure mode for which the second lifetime-probability distribution is determined by the second predictive model is the first failure mode.

Clause 18. The computing system of any of Clauses 15-17, wherein the first predictive model and the second predictive model are each selected from a set of predictive models that includes two or more of: a minor-evident model that considers a magnitude of a failure of the component, a condition-based model that considers whether a condition has been met on a per-aircraft basis based on sensor data obtained from the aircraft, a risk-equivalent model that considers in-service risk.

Clause 19. The computing system of any of Clauses 15-18, wherein the maintenance interval for the component is based, at least in part, on a combination of the first lifetime-probability distribution and the second lifetime-probability distribution.

Clause 20. The computing system of Clause 19, wherein the maintenance interval for the component is further based, at least in part, on a threshold risk level applied to the combination of the first lifetime-probability distribution and the second lifetime-probability distribution.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computing system for determining a maintenance interval for a subject aircraft configuration, the method comprising:
    obtaining sensor data obtained by a set of sensors and reported by an electronic system of each aircraft of a population of multiple aircraft of the subject aircraft configuration;
    obtaining a failure mode definition that identifies a set of failure modes involving a component of the subject aircraft configuration;
    obtaining a model definition that identifies, for each failure mode of a set of two or more failure modes involving the component, one or more predictive models to be implemented by the computing system for that failure mode from among a set of predictive models;
    for a first failure mode of the set of failure modes involving the component, selecting a first predictive model of the set of predictive models based on the model definition;
    implementing the first predictive model at the computing system to determine a first lifetime-probability distribution of the first failure mode involving the component based, at least in part, on the sensor data;
    for a second failure mode of the set of failure modes involving the component, selecting a second predictive model of the set of predictive models based on the model definition that differs from the first predictive model;
    implementing the second predictive model at the computing system that differs from the first predictive model to determine a second lifetime-probability distribution of the second failure mode involving the component based, at least in part, on the sensor data;
    determining a maintenance interval for the component based, at least in part, on the first lifetime-probability distribution and the second lifetime-probability distribution; and
    outputting the maintenance interval;
    wherein the set of predictive models includes two or more of:
        a minor-evident model that considers a magnitude of a failure of the component categorized as either (1) loss of function or (2) no loss of function, and by which a lifetime probability distribution determined for a failure mode is based on sensor data involving the loss of function and is not based on sensor data involving no loss of function,
        a condition-based model that considers whether a condition has been met on a per-aircraft basis based on the sensor data obtained from the aircraft as a prerequisite to utilizing the sensor data in determining a lifetime probability distribution of a failure mode,
        a risk-equivalent model that considers in-service risk by combining (1) a measure of scheduled maintenance with risk with (2) a measure of predictive maintenance with precision in determining a lifetime probability distribution of a failure mode based on sensor data.

2. The method of claim 1, further comprising:
implementing the first predictive model at the computing system to determine a third lifetime-probability distribution of a third failure mode of the set of failure modes involving the component based, at least in part, on the sensor data;
wherein the third failure mode differs from the first failure mode;
wherein determining the maintenance interval for the component is further based, at least in part, on the third lifetime-probability distribution.

3. The method of claim 1, further comprising:
implementing a third predictive model at the computing system to determine a third lifetime-probability distribution of a failure mode of the set of failure modes involving the component based, at least in part, on the sensor data;
wherein the third predictive model differs from the first predictive model and the second predictive model.

4. The method of claim 1, wherein the set of failure modes involving the component of the subject aircraft configuration includes a multi-component failure mode involving the component and one or more other components of the subject aircraft configuration; and
wherein the maintenance interval that is output is for a maintenance subtask for the component and the one or more other components of the multi-component failure mode.

5. The method of claim 1, further comprising:
obtaining a maintenance task definition that identifies a maintenance task for the subject aircraft configuration having a plurality of maintenance subtasks, and one or more components of the subject aircraft configuration for each maintenance subtask; and
associating the maintenance interval that is output with a maintenance subtask of the plurality of maintenance subtasks involving the component as identified by the maintenance task definition.

6. The method of claim 1, wherein the maintenance interval for the component is based, at least in part, on a combination of the first lifetime-probability distribution and the second lifetime-probability distribution.

7. The method of claim 6, wherein the maintenance interval for the component is further based, at least in part, on a threshold risk level applied to the combination of the first lifetime-probability distribution and to the second lifetime-probability distribution.

8. The method of claim 1, wherein the computing system includes a model definition interface by which data of the model definition is provided to the computing system as input data.

9. The method of claim 1, wherein the computing system includes a model definition interface by which data of the model definition is provided by the computing system as output data.

10. The method of claim 1, wherein the computing system includes a model definition interface by which data of the model definition is modified by users.

11. A computing system of one or more computing devices, comprising:
a logic machine; and
a storage machine having instructions stored thereon executable by the logic machine to:
obtain sensor data reported by an electronic system of each aircraft of a population of multiple aircraft of the subject aircraft configuration;
obtain a failure mode definition that identifies a set of failure modes involving a component of the subject aircraft configuration;
obtain a model definition that identifies, for each failure mode of a set of two or more failure modes involving the component, one or more predictive models to be implemented by the computing system for that failure mode from among a set of predictive models;
for a failure mode of the set of failure modes involving the component, select a first predictive model of the one or more predictive models based on the model definition;
implement the first predictive model at the computing system to determine a first lifetime-probability distribution of the first failure mode involving the component based, at least in part, on the sensor data;
for a second failure mode of the set of failure modes involving the component, select a second predictive model based on the model definition that differs from the first predictive model;
implement the second predictive model at the computing system that differs from the first predictive model to determine a second lifetime-probability distribution of the second failure mode involving the component based, at least in part, on the sensor data;
determine a maintenance interval for the component based, at least in part, on the first lifetime-probability distribution and the second lifetime-probability distribution; and
output the maintenance interval;
wherein the set of predictive models includes two or more of:
a minor-evident model that considers a magnitude of a failure of the component categorized as either (1) loss of function or (2) no loss of function, and by which a lifetime probability distribution determined for a failure mode is based on sensor data involving the loss of function and is not based on sensor data involving no loss of function,
a condition-based model that considers whether a condition has been met on a per-aircraft basis based on the sensor data obtained from the aircraft as a prerequisite to utilizing the sensor data in determining a lifetime probability distribution of a failure mode,
a risk-equivalent model that considers in-service risk by combining a measure of (1) scheduled maintenance with risk with (2) a measure of predictive maintenance with precision in determining a lifetime probability distribution of a failure mode based on sensor data.

12. The computing system of claim 11, wherein the maintenance interval for the component is based, at least in part, on a combination of the first lifetime-probability distribution and the second lifetime-probability distribution.

13. The computing system of claim 12, wherein the maintenance interval for the component is further based, at least in part, on a threshold risk level applied to the combination of the first lifetime-probability distribution and the second lifetime-probability distribution.

14. The computing system of claim 11, wherein the instructions are further executable to provide a model definition interface by which data of the model definition is provided to the computing system as input data.

15. The computing system of claim 11, wherein the instructions are further executable by the logic machine to:
obtain a maintenance task definition that identifies a maintenance task for the subject aircraft configuration having a plurality of maintenance subtasks, and one or more components of the subject aircraft configuration for each maintenance subtask; and
associate the maintenance interval that is output with a maintenance subtask of the plurality of maintenance subtasks involving the component as identified by the maintenance task definition.

16. The computing system of claim 11, wherein the set of failure modes involving the component of the subject aircraft configuration includes a multi-component failure mode involving the component and one or more other components of the subject aircraft configuration; and
wherein the maintenance interval that is output is for a maintenance subtask for the component and the one or more other components of the multi-component failure mode.

17. The computing system of claim 11, wherein the instructions are further executable by the logic machine to:
implement the first predictive model at the computing system to determine a third lifetime-probability distribution of a third failure mode of the set of failure modes involving the component based, at least in part, on the sensor data;
wherein the third failure mode differs from the first failure mode;
wherein determining the maintenance interval for the component is further based, at least in part, on the third lifetime-probability distribution.

18. The computing system of claim 11, wherein the instructions are further executable by the logic machine to:
implement a third predictive model at the computing system to determine a third lifetime-probability distribution of a failure mode of the set of failure modes involving the component based, at least in part, on the sensor data;
wherein the third predictive model differs from the first predictive model and the second predictive model.

19. The computing system of claim 11, wherein the instructions are further executable to provide a model definition interface by which data of the model definition is provided by the computing system as output data.

20. The computing system of claim 11, wherein the instructions are further executable to provide a model definition interface by which data of the model definition is modified by users.

* * * * *